United States Patent
Kluge

(10) Patent No.: US 9,302,279 B2
(45) Date of Patent: Apr. 5, 2016

(54) NOZZLE ARRANGEMENT FOR AN EDGE-STRIP APPLICATION DEVICE, FOR EXPOSING AN ADHESIVE FREE, HEAT-ACTIVATABLE EDGE STRIP OR WORKPIECE OR AN EDGE STRIP OR WORKPIECE WHICH IS COATED WITH HOTMELT ADHESIVE TO HOT GAS, AND EDGE-STRIP APPLICATION DEVICE HAVING A NOZZLE ARRANGEMENT

(71) Applicant: Holger Kluge, Schmallenberg (DE)

(72) Inventor: Holger Kluge, Schmallenberg (DE)

( * ) Notice: Subject to any disclaimer, the term of this patent is extended or adjusted under 35 U.S.C. 154(b) by 42 days.

(21) Appl. No.: 14/360,532

(22) PCT Filed: Nov. 22, 2012

(86) PCT No.: PCT/EP2012/073379
§ 371 (c)(1),
(2) Date: May 23, 2014

(87) PCT Pub. No.: WO2013/076205
PCT Pub. Date: May 30, 2013

(65) Prior Publication Data
US 2014/0339341 A1 Nov. 20, 2014

(30) Foreign Application Priority Data

Nov. 24, 2011 (DE) .................. 10 2011 055 690
Apr. 20, 2012 (DE) .................. 10 2012 103 508

(51) Int. Cl.
*B32B 37/00* (2006.01)
*B05B 1/24* (2006.01)
(Continued)

(52) U.S. Cl.
CPC . *B05B 1/24* (2013.01); *B27D 5/003* (2013.01); *B29C 63/003* (2013.01);
(Continued)

(58) Field of Classification Search
CPC ...... B05B 1/24; B29C 65/10; B29C 65/4815; B29C 66/472; B29C 66/723; B29C 66/836
USPC ........................................... 156/82, 497, 499
See application file for complete search history.

(56) References Cited

U.S. PATENT DOCUMENTS

| 4,950,352 A | * | 8/1990 | Greller | .................... | B29C 65/10 156/497 |
| 5,110,398 A | * | 5/1992 | Murphy | ................ | B29C 65/103 156/499 |

(Continued)

FOREIGN PATENT DOCUMENTS

| FR | 2318736 | 2/1977 |
| GB | 1516562 | 5/1978 |

(Continued)

OTHER PUBLICATIONS

International Search Report of PCT/EP2012/073379, mailed Feb. 21, 2013.
International Preliminary Examination Report of PCT/EP2012/073379, mailed Jun. 13, 2013 (10 pages).

*Primary Examiner* — James Sells
(74) *Attorney, Agent, or Firm* — Cohen & Hildebrand, PLLC

(57) ABSTRACT

The invention relates to nozzle arrangement (1) for edge strip applying device for supplying hot air to an edge strip (2) which is adhesive-free and heat activateable, with nozzle body (3) with air inlet channel (20, 21) connectable to hot air generator to feed pressurized hot air to nozzle body (3), at least two groups (4*a*, 4*b*, 4*c*) of air outlet openings (40), wherein the air outlet openings (40) are formed on air outlet surface (30) of nozzle body (3) at distance from one another in vertical direction, the outlet surface facing edge strip (2), and fluidically connected to at least one air inlet channel (20, 21) such that two groups (4*a*, 4*b*, 4*c*) are spaced from one another in advancing direction of edge strip (2) and hot air fed to the nozzle body (3) discharges out of the air openings (4) and supplied to edge strip (2) functional layer.

12 Claims, 6 Drawing Sheets

Figure 1:
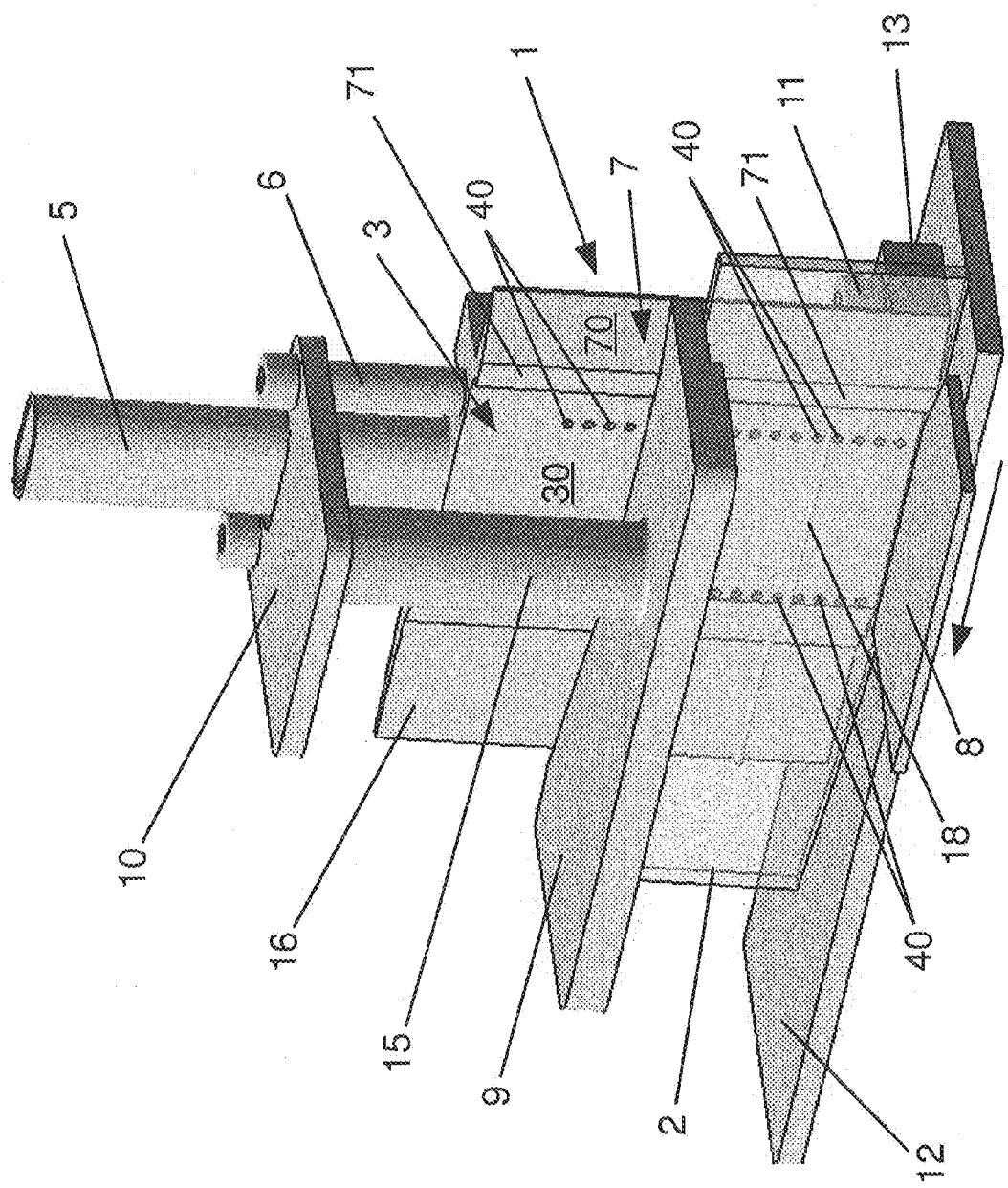

(51) Int. Cl.
- *B27D 5/00* (2006.01)
- *B29C 65/10* (2006.01)
- *B29C 63/00* (2006.01)
- *B29C 65/48* (2006.01)
- *B29C 65/78* (2006.01)
- *B29C 65/16* (2006.01)
- *B29C 65/00* (2006.01)

(52) U.S. Cl.
CPC ............ *B29C 63/0065* (2013.01); *B29C 65/10* (2013.01); *B29C 65/4815* (2013.01); *B29C 65/7841* (2013.01); *B29C 66/112* (2013.01); *B29C 66/114* (2013.01); *B29C 66/472* (2013.01); *B29C 66/723* (2013.01); *B29C 66/836* (2013.01); *B29C 66/84121* (2013.01); *B29C 65/16* (2013.01); *B29C 66/028* (2013.01); *B29C 66/7487* (2013.01); *B29C 66/919* (2013.01); *B29C 66/9141* (2013.01); *B29C 66/934* (2013.01); *B29C 66/939* (2013.01)

(56) References Cited

U.S. PATENT DOCUMENTS

| | | | | |
|---|---|---|---|---|
| 5,935,357 | A * | 8/1999 | Hubbard | B29C 66/1122 156/497 |
| 6,149,762 | A * | 11/2000 | Kobzan | B29C 66/1122 156/497 |
| 2004/0094576 | A1* | 5/2004 | Martinez | B29C 65/12 222/146.5 |
| 2008/0066871 | A1* | 3/2008 | Gisler | B29C 66/1122 156/497 |
| 2008/0121333 | A1* | 5/2008 | Dugan | B29C 65/10 156/71 |
| 2008/0142164 | A1* | 6/2008 | Martinez | B29C 65/12 156/497 |

FOREIGN PATENT DOCUMENTS

| | | |
|---|---|---|
| WO | 2006101630 | 9/2006 |
| WO | 2008090056 | 7/2008 |

\* cited by examiner

NOZZLE ARRANGEMENT FOR AN EDGE-STRIP APPLICATION DEVICE, FOR EXPOSING AN ADHESIVE FREE, HEAT-ACTIVATABLE EDGE STRIP OR WORKPIECE OR AN EDGE STRIP OR WORKPIECE WHICH IS COATED WITH HOTMELT ADHESIVE TO HOT GAS, AND EDGE-STRIP APPLICATION DEVICE HAVING A NOZZLE ARRANGEMENT

This is an application filed under 35 USC §371 of PCT/EP2012/073379, claiming priority to DE 10 2011 055 690.7 filed on Nov. 24, 2011, DE 10 2012 103 508.3 filed on Apr. 20, 2012.

The present invention relates to a nozzle arrangement for an edge-strip application device, for exposing an adhesive-free, heat-activatable edge strip or workpiece or an edge strip or workpiece that is coated with hotmelt adhesive to hot air. Furthermore, the present invention relates to an edge-strip application device having a nozzle arrangement.

Various embodiments of edge-strip application devices (frequently also known as edge banding devices), by means of which edge strips can be applied to the narrow sides of a workpiece, are known from the prior art. The edge strips, which are frequently also designated edge bands, may for example have a heat-activatable adhesive on one side. This adhesive is activated in the edge-strip application device by being exposed to hot air or hot gases such that, after the edge strip has been applied to and pressed against the narrow side of the workpiece, a cohesive joining connection of the edge strip to this narrow side is created. In some cases, the edge strips are provided on one side with an adhesive only in the edge-strip application device and subsequently cohesively connected to the narrow side of the workpiece, which may be in particular a wooden workpiece. It has been shown that the use of adhesives in the application of edge strips to the narrow sides of a workpiece is associated with a number of disadvantages. In addition to difficulties in terms of process engineering, the problem frequently arises that the adhesive layer remains visible to an observer after the edge strip has been applied to the workpiece and thus impairs the optical appearance.

In order to remedy the abovementioned problems, adhesive-free, heat-activatable edge strips which may be activated for example by exposure to laser light or by plasma processes have been developed in the meantime. These edge strips consist of two layers of different—preferably coextruded—plastics materials. As a result of the exposure to laser light, the plastics layer that faces the narrow side of the workpiece (functional layer for short) is melted and can be adhesively bonded to the narrow side. The plastics layer on the visible side (outer side) of the edge strip is, by contrast, not altered by the exposure to the laser light. Since the two plastics layers expediently do not differ in coloration, a smooth, uniform optical appearance is created. Although laser devices for activating the functional layer of the edge strip allow high working rates, they are relatively expensive and complicated to operate in terms of process engineering. The possibility, already known from the prior art, of activating the functional layer by way of a plasma is likewise very complicated in terms of process engineering and allows only comparatively low working rates. Therefore, a number of attempts have already been made in the past to expose the functional layer of the edge strip to pressurized hot air at a temperature of around 600° C. by means of a nozzle arrangement and to activate said functional layer. In comparison to laser activation and plasma activation, such a procedure is simpler and more cost-effective in terms of process engineering. However, the working rates that have been achievable thus far are not yet satisfactory. Thus, for industrial applications, working rates of 20 m/min or more are desirable.

The present invention is based on the object of providing a nozzle arrangement and an edge-strip application device of the type mentioned at the beginning, which allow efficient heating and activation of the functional layer of adhesive-free, heat-activatable edge strips or workpieces or edge strips or workpieces that have been precoated on one side with an activatable hotmelt adhesive, such that high working rates can be achieved.

With regard to the nozzle arrangement, this object is achieved by a nozzle arrangement having the features of claim 1. With regard to the edge-strip application device, this object is achieved by an edge-strip application device having the features of claim 12. The dependent claims relate to advantageous developments of the invention.

A nozzle arrangement according to the invention comprises a nozzle body having
  at least one air-inlet duct which is connectable to a hot-air generator such that pressurized hot air can be fed to the nozzle body during operation of the edge-strip application device,
  at least two groups of air-outlet openings, wherein the air-outlet openings are configured in a manner spaced apart from one another in the vertical direction on an air-outlet surface, facing the edge strip, of the nozzle body and are connected in terms of flow to the at least one air-inlet duct such that the at least two groups of air-outlet openings are spaced apart from one another in the advancing direction of the edge strip and the hot air fed to the nozzle body can flow out of the air-outlet openings and can be exposed to a heat-activatable functional layer of the edge strip,
  a number of closure members that corresponds to the number of groups of air-outlet openings, said closure members being configured such that at least some of the air-outlet openings can be selectively opened or closed depending on the width of the fed edge strip.

The nozzle arrangement according to the invention allows efficient heating and activation of the functional layer of adhesive-free, heat-activatable edge strips which consist of (at least) two preferably coextruded plastics layers, prior to application to a narrow side of the workpiece. Likewise, edge strips (or workpieces) which have been precoated on one side with a hotmelt adhesive can be heated in a very efficient manner. The air-outlet openings may be formed in particular in a cylindrical manner and have preferably a diameter of from about 1 to 1.5 mm and a depth in the nozzle body of about 1.5 mm. As a result, the pressurized hot air which is fed to the nozzle body during operation and is at a temperature of about 600° C. can be introduced locally into the functional layer of the edge strip such that said functional layer can be melted effectively before the edge strip comes into abutment against the narrow side of the workpiece and is connected cohesively to the latter. The closure members allow the outlet flow of hot air to be adapted easily to different widths of the fed edge strip. It has been shown that, given a configuration of the main body with two groups of air-outlet openings which are configured in the above-described manner, delivery rates of the edge strip in the edge-strip application device of up to 20 m/min can be achieved. An embodiment of the main body with three (or more) groups of air-outlet openings is about 15 mm longer and intended in particular for edge-strip application devices which have particularly high working rates of more than 20 m/min, in order as a result to realize a higher heat emission. Given such an embodiment with three (or more) groups of air-outlet openings, working rates of about 25 m/min are realizable without particular outlay.

In a preferred embodiment, it is proposed that the nozzle body has a number of air-outlet ducts, configured preferably in a hollow-cylindrical manner, that corresponds to the number of groups of air-outlet openings, said air-outlet ducts being connected in terms of flow to the at least one air-inlet duct and comprising the air-outlet openings.

Preferably, the closure members may be configured such that they can be guided axially into the air-outlet ducts in order to close at least some of the air-outlet openings. The closure members may be formed in particular cylindrically. In a particularly advantageous embodiment, the nozzle arrangement may comprise a closure-member holder on which the closure members are fitted such that they are adjustable simultaneously in the air-outlet ducts. As a result, easily manageable adjustment of the closure members and easy adaptation of the hot-air outlet characteristics to different edge widths is made possible. Alternatively, it is also possible for the nozzle arrangement to comprise a closure-member holder on which the closure members are fitted such that at least one of the closure members is adjustable independently of the remaining closure members.

In order to improve the hot-air distribution within the nozzle body and to achieve a homogeneous outlet of hot air, it is proposed in a particularly advantageous embodiment that the nozzle body comprises a plurality of preferably hollow-cylindrical air-distribution ducts which extend in the transverse direction through the at least one air-inlet duct and through the air-outlet ducts. Furthermore, as a result of this measure, the nozzle body has virtually the properties of a hollow body on account of the multiplicity of air-inlet ducts, air-distribution ducts and air-outlet ducts. The nozzle body thus has a relatively low mass such that advantageously only a relatively small amount of thermal energy for heating the material of the nozzle body is initially withdrawn from the hot air flowing in.

In order to improve the guidance of the edge strip, a particularly preferred embodiment provides for the nozzle arrangement to have an edge-strip hold-down means which is configured such that it can guide an upper edge of the edge strip along the nozzle body. A plate-like edge-strip guiding means, which may have for example a material thickness of about 1.5 mm, may be arranged on a base plate or the edge-strip application device such that a lower peripheral section of the edge strip can be guided between the edge-strip guiding means and the air-outlet surface of the nozzle body.

In order to further simplify management, it is possible in a particularly advantageous embodiment for the nozzle arrangement to comprise a connecting means by means of which the edge-strip hold-down means and the closure-member holder are connected together. This makes it possible in a particularly simple manner to adapt the nozzle arrangement to edge strips having different widths, since, in one work step, the edge hold-down means and the closure members can be adjusted and adapted to the edge-strip width. In order to simplify production, the closure-member holder, the connecting means and the edge-strip hold-down means may be configured integrally as a one-piece component.

In order to improve the guidance of the edge strip on the entry side, it is proposed in a preferred embodiment that the nozzle body has, in an entry region of the edge strip, a guiding section that is beveled sectionally, widens in the advancing direction and is preferably beveled sectionally in a wedge-shaped manner. In order to make it easier to "thread in" the edge strip, the edge-strip guiding means may be formed in a beveled manner in a region located opposite the wedge-like guiding section.

In a particularly preferred embodiment, it is possible for the guiding section to have a sloping surface section that widens in the advancing direction of the edge strip, and a spacer section that adjoins said sloping surface section, extends in the vertical direction and is raised, preferably by about 1.5 mm, with respect to the air-outlet surface of the nozzle body. This configuration of the entry-side guiding section with the spacer section ensures that when the edge strip is in abutment, there is no direct contact with the air-outlet surface of the nozzle body, which could result under certain circumstances in smearing of the heated and as a result melted functional layer of the edge strip on the nozzle body. In addition, the hot air can no longer flow into the entry region of the edge strip but only onto the functional layer of the edge strip and into an exit region for the edge strip, in the direction of the workpiece.

In order to improve the guidance of the edge strip following heating and melting of the functional layer, it is proposed in a particularly preferred embodiment that, downstream of the air-outlet surface in the advancing direction of the edge strip, the nozzle body has an exit region that narrows and is preferably formed at least sectionally in a wedge-like manner.

Advantageously, the nozzle arrangement may have a guiding means, extending in the horizontal direction, for the edge strip, said guiding means preferably being formed by a steel wire which is connected to the nozzle body in a region facing the edge strip and extends in particular along the entire length of the air-outlet surface and of the exit region of the nozzle body. This guiding means additionally ensures in an advantageous manner that the functional layer of the edge strip does not come into contact with the air-outlet surface of the nozzle body during operation.

The nozzle body, presented here, of the nozzle arrangement may preferably be produced in one piece from a heat-resistant steel material in order to reduce the production costs of the nozzle arrangement.

In accordance with a further advantageous embodiment, which is suitable in particular for edge strips having an activatable hotmelt adhesive, the nozzle body may comprise a further group of air-outlet openings which is formed preferably in the exit region, which is narrowed sectionally and shaped in a wedge-like manner, for the edge strips. These air-outlet openings may be shaped for example in an oval or circular manner. These air-outlet openings in the exit region of the nozzle body serve the purpose of reactivating the hotmelt adhesive of the edge strip for the last approximately 10 cm of the workpiece to be processed. As a result of this reactivation, the adhesive outcome can be significantly improved, such that when gluing takes place what is known as a zero-joint can virtually be achieved and thus a visually very high-quality glued finish. This additional group of air-outlet openings is preferably connected in terms of flow to that group of air-outflow openings which adjoins the planar air-outlet surface of the nozzle body in the wedge-shaped exit region. This variant of the nozzle arrangement is suitable in a particularly advantageous manner for the activation of conventional edge strips that are provided on one side with a hotmelt adhesive. The air-outlet openings of the two above-mentioned groups that are connected together in terms of flow and can be opened and closed with a separate closure member independently of the other groups of air-outlet openings serve the exclusive purpose of reactivating the hotmelt adhesive of the edge strips for the last approximately 10 cm of the workpiece to be processed.

During operation of the edge-strip application device and the application of the edge strip to the workpiece, the closure member which is assigned to the two abovementioned air-outlet openings that are connected together in terms of flow remains initially in its "lower" position (closed position), in which it can prevent the outlet of hot air out of these two groups of air-outlet openings. During operation, the hot air thus flows initially only through the remaining group(s) of air-outlet openings onto that surface of the edge strip that is to be heated with the hot air. The operation of the edge-strip application device is controlled such that the air-outlet duct assigned to these two groups of air-outlet openings is only opened, by the third closure member being moved axially, when the last approximately 10 cm of the workpiece pass the nozzle arrangement of the edge-strip application device. Then, the hot air also flows through the air-outlet openings of these two groups. The advantageous result of this is that the edge strip can be glued reliably and with high quality in the region of the last approximately 6 cm to 10 cm of the workpiece, too. Otherwise, the last about 6 cm to 10 cm of the edge strip to be applied to the workpiece would be heated and activated only in a satisfactory manner and thus not optimally. In order to avoid overheating of remaining plant parts (for example pressure rollers or the like), the closure member in question is subsequently immediately transferred back into its closed position so that hot air can no longer emerge from these air-outlet openings that are provided only for reactivation.

An edge-strip application device according to the invention is distinguished by at least one nozzle arrangement according to one of claims 1 to 11. It allows efficient heating of the functional layer of adhesive-free, heat-activatable edge strips at high working rates, such that the narrow sides of workpieces can be provided very cost-effectively with edge strips. The edge-strip application device according to the invention is also suitable for conventional edge strips or workpieces that are provided with an activatable hotmelt adhesive, and delivers high-quality work results.

Figure 2:
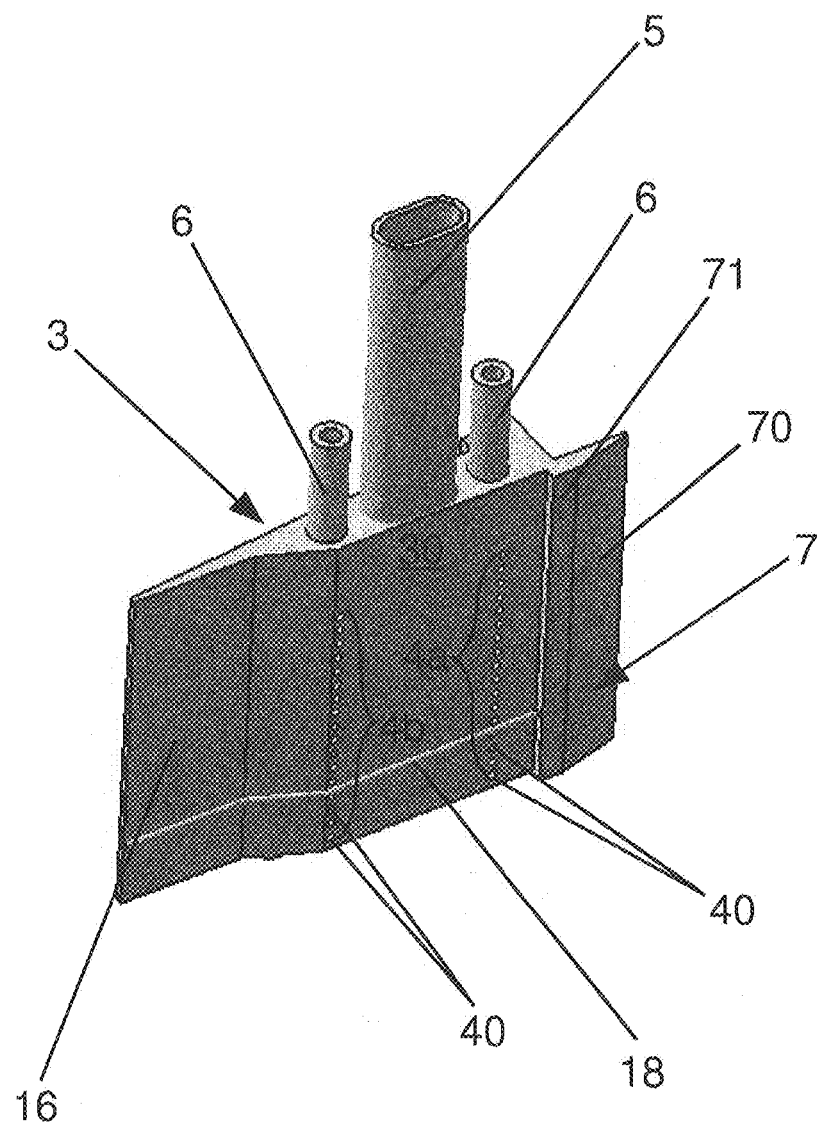
Figure 3:
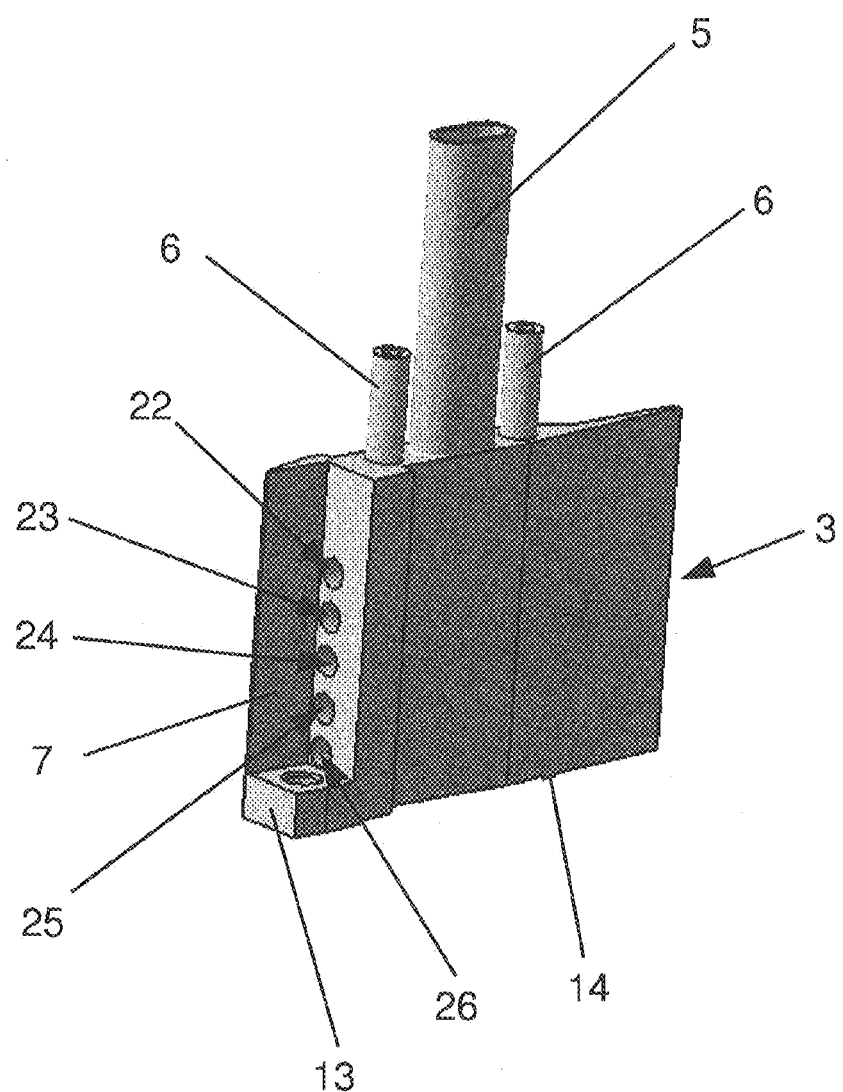
Figure 4:
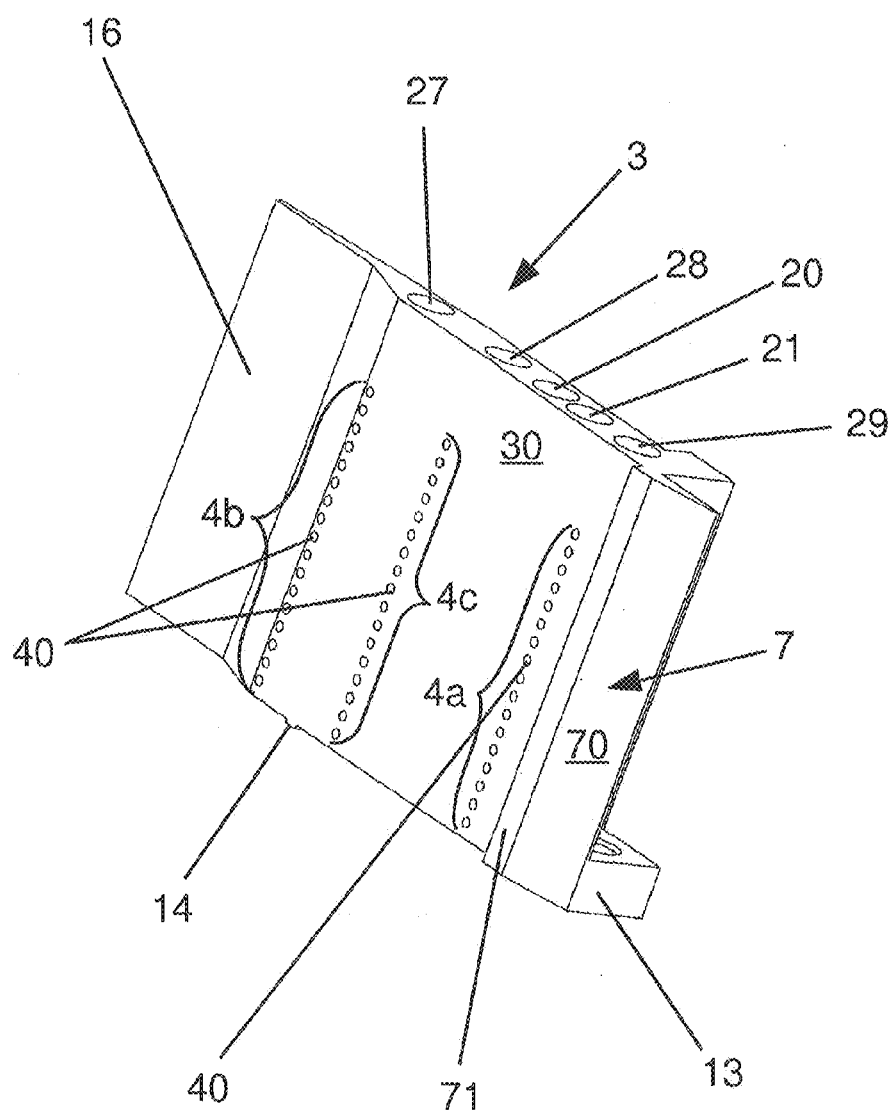
Figure 5:
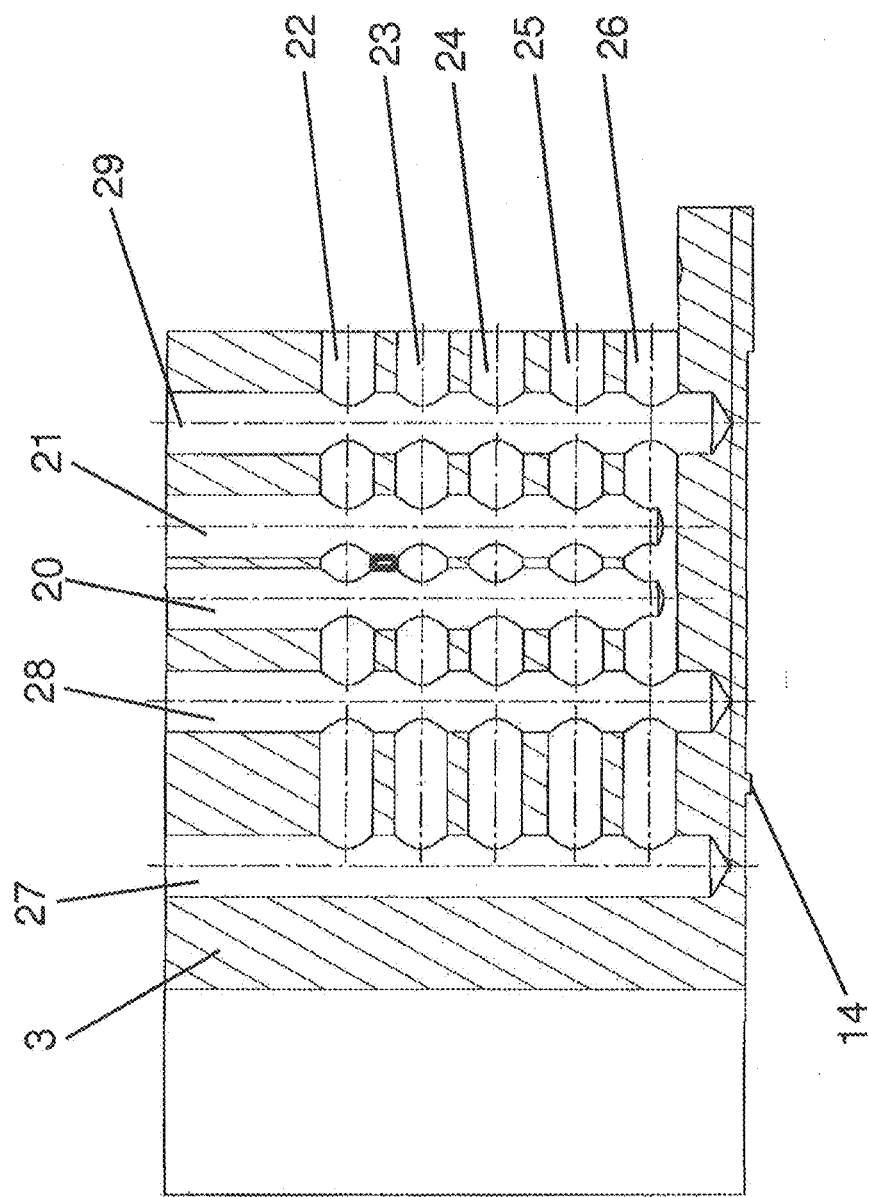
Figure 6:
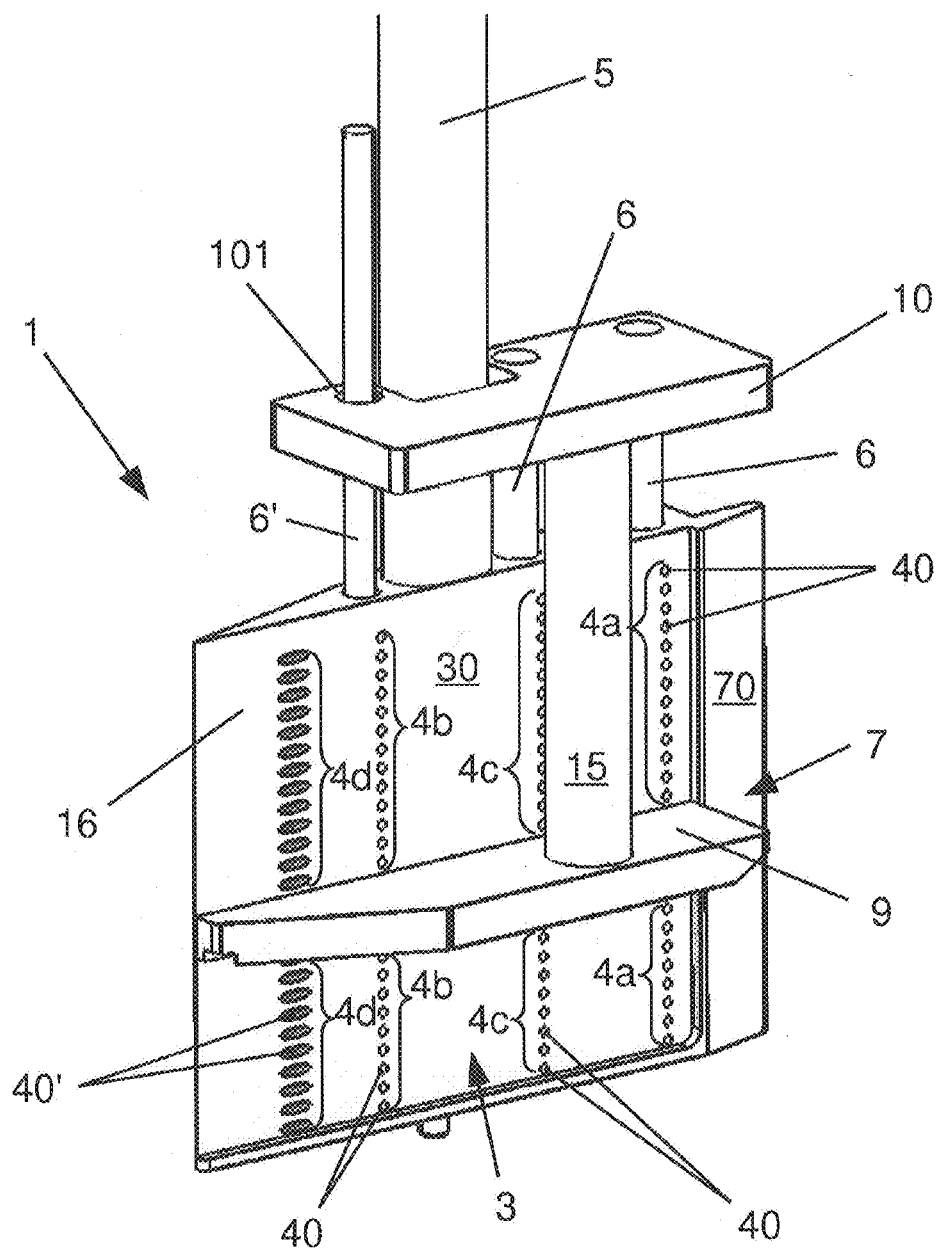

Further features and advantages of the present invention are apparent from the following description of preferred exemplary embodiments with reference to the appended drawings, in which:

FIG. 1 shows a perspective illustration of a nozzle arrangement for exposing an adhesive-free, heat-activatable edge strip to hot air, FIG. 2 shows a perspective front view of a nozzle body of the nozzle arrangement according to FIG. 1, FIG. 3 shows a perspective rear view of the nozzle body according to FIG. 2, FIG. 4 shows a perspective illustration of a nozzle body which is embodied in accordance with a second exemplary embodiment, FIG. 5 shows a longitudinal section through the nozzle body according to FIG. 4, FIG. 6 shows a perspective view of a nozzle arrangement according to a further exemplary embodiment of the present invention.

With reference to FIG. 1, the basic design of a nozzle arrangement 1 for an edge-strip application device for exposing an adhesive-free, heat-activatable edge strip 2 to hot air in accordance with a preferred exemplary embodiment of the present invention is intended to be explained in more detail. The nozzle arrangement 1 comprises a nozzle body 3, which in this exemplary embodiment is produced in one piece from a heat-resistant steel material. The nozzle body 3 is shaped such that it is embodied in a comparatively narrow manner transversely to an advancing direction, indicated in FIG. 1 by way of an arrow, of the edge strip 2, since the space available in the edge-strip application device for positioning the nozzle arrangement 1 is usually relatively tight. The nozzle arrangement 1 is arranged in the edge-strip application device such that it is positioned immediately upstream, in the advancing direction of the edge strip 2, of a first edge-strip pressure roller, by means of which the edge strip 2 can be pressed against the narrow side of the workpiece. The edge strip 2, which is illustrated in a transparent manner in FIG. 1 for reasons of simplification, consists of (at least) two layers of different—preferably coextruded—plastics materials. A first layer (functional layer in the following text), which faces the nozzle body 3 of the nozzle arrangement 1 and thus also the narrow side of the workpiece, consists of a plastics material which can be melted by being exposed to pressurized hot air and can subsequently be cohesively connected to the narrow side of the workpiece. The plastics layer on the visible side (outer side) of the edge strip 2 is, by contrast, formed such that it is not altered by the exposure to the hot air, and in particular does not melt. The two plastics layers of the edge strip 2 do not expediently differ in coloration, and so once the edge strip 2 has been applied to the workpiece, a uniform optical appearance without disruptive joints is created. The use of an edge strip 2 that is coated with hotmelt adhesive is likewise possible.

With reference to FIGS. 2 and 5, the structure of two nozzle bodies 3 which can be used in the nozzle arrangement 1 disclosed here is intended to be explained in more detail. In the exemplary embodiment illustrated in FIGS. 2 and 3, the nozzle body 3 has, on a planar air-outlet surface 30, a first group 4a and a second group 4b of air-outlet openings 40, and in the exemplary embodiment illustrated in FIGS. 4 and 5 also a third group 4c of air-outlet openings 40. In the two exemplary embodiments presented here, the air-outlet openings 40 of each of the two or three groups are each arranged one above the other in a manner spaced apart from one another in the vertical direction in the installed position of the nozzle body 3. The two exemplary embodiments of the nozzle body 3 thus differ in terms of their dimensions and the number of groups 4a, 4b, 4c, oriented parallel to one another, of the air-outlet openings 40. The air-outlet openings 40 are shaped in a cylindrical manner and preferably have a diameter of about 1 to 1.5 mm and a depth in the nozzle body 3 of about 1.5 mm. As a result, the pressurized hot air supplied to the nozzle body 3 during operation can be introduced locally into the functional layer of the edge strip 2 such that said functional layer can be effectively melted before the edge strip 2 comes into abutment against the narrow side of the workpiece and is connected cohesively thereto.

As can be seen in FIG. 4, the nozzle body 3 has two hollow-cylindrical air-inlet ducts 20, 21 which extend in the vertical direction from the top side thereof and are in the form of vertical bores in the present case. Arranged on the top side of the nozzle body 3 is a hot-air feed connection piece 5 which is preferably welded firmly to the top side of the nozzle body 3 and in the present case has a cross-sectional shape in the form of an elongate oval such that it encloses the air-inlet openings of the two air-inlet ducts 20, 21. Via this hot-air feed connection piece 5, which is attachable to a hot-air generator, hot air that has been heated to about 600° C. is fed under high pressure to the nozzle body 3 during operation. This hot air can flow into a lower region of the nozzle body 3 through the two air-inlet ducts 20, 21. Furthermore, the nozzle body 3 comprises a plurality of horizontal, hollow-cylindrical air-distribution ducts 22-26 which extend in an orthogonal manner through the two air-inlet ducts 20, 21 and through two (see FIGS. 2 and 3) or three (see FIGS. 2 and 3) likewise hollow-cylindrical air-outlet ducts 27, 28, 29 which extend in the vertical direction and comprise the air-outlet openings 40. As a result, the fed hot air can be distributed homogeneously within the nozzle body 3 and emerge through the air-outlet openings 40 of the two groups 4a, 4b or three groups 4a, 4b, 4c of air-outlet openings 40 and meet the functional layer of the edge strip 2 in order to heat and melt the functional layer. The horizontal air-distribution ducts 22-26 (in this exemplary embodiment, five horizontal air-distribution ducts 22-26 are provided) can be produced in that corresponding horizontal bores are introduced into the nozzle body 3, the lateral openings, visible in FIG. 3, of said bores at the outer surface subsequently being welded in a sealed manner again. The hollow-cylindrical air-outlet ducts 27, 28, 29 are likewise embodied as vertical bores and in the present case have a somewhat greater extent in the vertical direction than the air-inlet ducts 20, 21. It is apparent in particular from FIG. 5 that the nozzle body 3 has virtually the properties of a hollow body on account of the multiplicity of air-inlet ducts 20, 21, air-distribution ducts 22-26 and air-outlet ducts 27, 28, 29. On account of the vertical air-inlet ducts 20, 21 and air-outlet ducts 27, 28, 29 and the air-distribution ducts 22-26 that extend in an orthogonal manner thereto, the nozzle body 3 has a relatively low mass, and so only a comparatively small amount of thermal energy for heating the material of the nozzle body 3 is initially taken from the hot air that flows in.

As already stated above, the functional layer of the edge strip 2 has to be activated shortly before the first pressure roller of the edge-strip application device is reached, in order that it can be connected cohesively to the narrow side of the workpiece. In other words, the functional layer of the edge strip 2 has to have been melted and thus softened a few centimeters before the first pressure point which is formed by the first pressure roller is reached. Since the overall space available within the edge-strip application device is very small, the relatively narrow structural configuration of the nozzle body 3 allows a reliable and targeted feed of heat to the functional layer of the edge strip 2. The nozzle body 3 and the associated components ensure that when the edge strip 2 passes through, a type of hot-air duct arises which keeps the hot air between the edge strip 2 and the narrow side of the workpiece until shortly before the first pressure point is reached. The hot air emerges from the air-outlet openings 40 of the two groups 4a, 4b or three groups 4a, 4b, 4c and is directed in the direction of the edge strip 2 and of the workpiece.

In order to achieve reliable guidance of the edge strip 2 during the advancing movement, the nozzle arrangement 1 furthermore has, in an entry region of the edge strip 2, a guiding section that is sectionally beveled in a wedge-shaped manner and widens in the advancing direction, said guiding section 7 being formed integrally with the nozzle body 3 in this exemplary embodiment. This wedge-like guiding section 7 comprises a widening sloping surface section 70 and a spacer section 71 that adjoins said sloping surface section 70, extends in the vertical direction and is raised, preferably by about 1.5 mm, with respect to the air-outlet surface 30 of the nozzle body 3. This above-described configuration of the entry-side guiding section 7 having the spacer section 71 ensures that when the edge strip 2 is in abutment, there is on direct contact with the air-outlet surface 30 of the nozzle body 3, which could result in smearing of the heated and as a result melted functional layer of the edge strip 2 on the nozzle body 3. In addition, the hot air does not flow into the entry region of the edge strip 2 but only onto the functional layer of the edge strip 2 and into an exit region 16 for the edge strip 2, in the direction of the workpiece, said outlet region 16 likewise being formed integrally in this exemplary embodiment with the nozzle body 3, narrowing sectionally and being shaped in a wedge-like manner.

As can be seen in particular in FIG. 2, an additional guiding means 18 that extends in the horizontal direction can furthermore be provided, said guiding means being formed in the present case by a steel wire which is preferably about 1 mm thick, is welded to the nozzle body 3 in the region facing the edge strip 2 and extends preferably along the entire length of the air-outlet surface 30 and of the exit region 16. This guiding means 18 additionally ensures that the functional layer of the edge strip 2 does not come into contact with the air-outlet surface 30 of the nozzle body 3 during operation.

A plate-like edge-strip guiding means 8, which preferably has a material thickness of about 1.5 mm, is arranged on a base plate 12 of the edge-strip application device such that a lower peripheral section of the edge strip 2 can be guided between the edge-strip guiding means 8 and the air-outlet surface 30 of the nozzle body 3. In order to make it easier to "thread in" the edge strip 2, the edge-strip guiding means 8 is formed in a beveled manner in a region located opposite the wedge-like guiding section 7, in order to guide an upper peripheral section of the edge strip 2, provision is made of an edge hold-down means 9 which in the present case is likewise formed in a plate-like manner, preferably has an overall thickness of about 6 mm and has a groove or the like which is about 1.5 mm thick in a region close to the periphery and facing the nozzle body 3. The peripheral section, facing the nozzle body 3, of the edge hold-down means 9 is formed such that if is adapted to the outer contour of the nozzle body 3. As seen in the advancing direction of the edge strip 2, the nozzle body 3 has, downstream of the air-outlet surface 30, the exit region 16, which narrows and is shaped in a wedge-like manner. Said exit region 16 not only serves to guide the edge strip but also to maintain the hot-air duct formed from the edge strip 2, the nozzle body 3 and the edge hold-down means 9 for as long as possible.

As can be seen in FIG. 1, during operation of the edge-strip application device, the edge strip 2 is guided reliably in front of the nozzle body 3, between the edge-strip guiding means 3 and the edge-strip hold-down means 9. In order to avoid damage, in particular scratches which impair the visual appearance on the visible side of the edge strip 2, the guidance takes place with the aid of the edge-strip guiding means 8 and of the edge hold-down means 9 preferably in each case only about 1.5 mm away from the upper and lower edges of the edge strip 2. During feeding, the edge strip 2 is thus always about 3 to 4 mm wider than the narrow side of the workpiece to which the edge strip 2 is intended to be applied. After the edge strip 2 has been applied to the narrow side of the workpiece, the overlap that is formed is machined off in the edge-strip application device by means of a suitably embodied removal device.

As explained above, the nozzle bodies 3 are embodied in the present case such that they have two or three groups 4a, 4b, 4c of air-outlet openings 40. The embodiment of the main body 3 with two groups 4a, 4b of air-outlet openings 40 is suitable in particular for edge-strip application devices which have delivery rates of up to 20 m/min. The embodiment of the main body 3 with three groups 4a, 4b, 4c of air-outlet openings 40 is about 15 mm longer and intended in particular for edge-strip application devices which have particularly high working rates of more than 20 m/min, in order as a result to realize a higher heat emission. In such an embodiment having three groups 4a, 4b, 4c of air-outlet openings 40, working rates of about 25 m/min are realizable without particular outlay. It should be noted at this point that the nozzle body 3 can also be formed in principle such that it has more than three groups 4a, 4b, 4c of air-outlet openings 40. The extent of the nozzle body 3 in the vertical direction and the number of air-outlet openings 40 of the at least two groups 4a, 4b are adapted to the maximum edge-strip width to be processed in the edge-strip application device.

In order to be able to regulate the outlet of hot air from the air-outlet openings 40, the nozzle arrangement 1 has a number of closure members 6 corresponding to the number of groups 4a, 4b, 4c of the air-outlet openings 40, said closure members 6 being shaped in a cylindrical manner in the present case and being configured such that they can be introduced into the vertical air-outlet ducts 27, 28, 29 from the top side of the nozzle body 3, can be axially moved in said air-outlet ducts 27, 28, 29 and can be held in their working position. The closure members 6 are attached to a closure-member holder 10 which is formed in a plate-like manner in the present case and is connected to the edge-strip hold-down means 9 via a connecting means 15 that extends from the closure-member holder 10 to the edge-strip hold-down means 9. The closure members 6 extend in the vertical direction preferably as far as the recess in the edge-strip hold-down means 9. In order to simplify production, the closure-member holder 10, the connecting means 15 and the edge-strip hold-down means 9 can be formed integrally as a one-piece component.

Depending on the width of the edge strip 2, the air-outlet openings 40 can be closed selectively by means of the cylindrical closure members 6, such that hot air can no longer flow out of said air-outlet openings 40. The closure members 6 are in this case introduced so far into the cylindrical air-outlet ducts 27, 28, 29 that those air-outlet openings 40 which are not needed for exposing the functional layer of the edge strip 2 to hot air on account of the width of said edge strip 2 are closed. In other words, those air-outlet openings 40 of the two or three groups 4a, 4b, 4c of air-outlet openings 40 that are not required for exposing an edge strip 2 of predetermined width are closed by the adjustment of the associated closure members 6 such that the edge strip 2 is exposed to hot air only over its actual width. Since the closure members 6, the closure-member holder 10 and the edge-strip hold-down means 9 are connected together by the connecting means 15, it is easily possible to close the air-outlet openings 40 by way of vertical adjustment of the edge-strip hold-down means 9 such that only those air-outlet openings 40 which face the functional layer of the edge strip 2 remain open. By setting the edge-strip hold-down means 9, the nozzle arrangement 1 can thus be adapted very easily to edge strips 2 having different widths.

By means of at least one fastening screw 11, the nozzle arrangement 1 is screwed together with the base plate 12 of the edge-strip application device. To this end, on that side of the guiding section 7 that faces away from the edge strip 2, a base means 13 is configured with a bore through which the fastening screw 11 can be passed and can subsequently be screwed together with the base plate 12. The nozzle body 3 is in contact with the base plate 12 of the edge-strip application device in the region of the guiding section 7. Otherwise, the nozzle body 3 has been willed free by about 0.5 mm, apart from a relatively small supporting section 14. As a result, the introduction of heat from the nozzle body 3 into the base plate 12 can be effectively reduced.

The nozzle arrangement 1 presented here is distinguished in particular by a compact construction which makes it possible for conventional edge-strip application devices to be equipped easily with the nozzle arrangement 1. Furthermore, it is optionally possible for the edge-strip application device equipped with the nozzle arrangement 1 to be operated conventionally with a laser device in order to activate the functional layer of the edge strip 2, or with conventional edge strips which are connected to the narrow sides of a workpiece by means of a hotmelt adhesive.

With reference to FIG. 6, a further exemplary embodiment of a nozzle arrangement 1 is intended to be explained in more detail in the following text, said nozzle arrangement 1 being suitable in a particularly advantageous manner for the activation of conventional edge strips 2 or workpieces that are provided on one side with a hotmelt adhesive. The basic structure of the nozzle body 3 has numerous features in common with the variants described above with reference to FIGS. 1 to 5, and so the differences will primarily be dealt with in the following text.

The nozzle body 3 has, in addition to the three groups 4a, 4b, 4c of air-outlet openings 40, a fourth group 4d of air-outlet openings 40' which—like the second group 4b of air-outlet openings 40—is connected in terms of flow to the first air-outlet duct 27. This fourth group of air-outlet openings 40' is configured for the edge strip 2 in the exit region 16, which narrows sectionally and is shaped in a wedge-like manner. The air-outlet openings 40' of the fourth group 4d are shaped in an oval manner in the exemplary embodiment shown here. However, they may also optionally be configured in a circular manner. The air-outlet openings 40' of the fourth group 4d and the air-outlet openings 40 of the second group 4b exclusively serve the purpose in the present case of reactivating the hotmelt adhesive of the edge strip 2 for the last approximately 10 cm of the workpiece to be processed. As a result of this reactivation, the adhesive outcome can be significantly improved, such that when gluing takes place what is known as a zero-joint can virtually be achieved and thus a visually very high-quality glued finish.

In order to be able to regulate the outlet of hot air from the air-outlet openings 40, 40', in this exemplary embodiment, the nozzle arrangement 1 has three closure members 6, 6' which are shaped in a cylindrical manner in the present case and are configured such that they can be introduced into the vertical air-outlet ducts 27, 28, 29 from the top side of the nozzle body 3, can be axially moved in said air-outlet ducts 27, 28, 29 and can be held in their working position. A first and a second closure member 6 are attached firmly to the closure-member holder 10, which is connected to the edge-strip hold-down means 9 via a connecting means 15 that extends from the closure-member holder 10 to the edge-strip hold-down means 9. These two closure members 6 extend in the vertical direction preferably as far as the recess in the edge-strip hold-down means 9. In order to simplify production, the closure-member holder 10, the connecting means 15 and the edge-strip hold-down means 9 can again be configured as a one-piece component.

The third cylindrical closure member 6' is actuable separately—in particular by means of an air cylinder—from the two other closure members and extends through a circular bore 101 in the closure-member holder 10 and is thus not firmly connected to the latter. As a result, the separate actuability of the third cylindrical closure member 6' for selectively opening and closing the first air-outlet duct 27, which is connected in terms of flow to the air-outlet openings 40 of the second group 4b and to the air-outlet openings 40' of the fourth group 4d, is realized.

During operation of the edge-strip application device and the application of the edge strip 2 to the workpiece, the third closure member 6' initially remains in its "lower" position (closed position), in which it can prevent the outlet of hot air from the second group 4b and the fourth group 4d of air-outlet openings 40, 40'. During operation, the hot air thus initially flows only through the two remaining groups 4a, 4c of air-outlet openings 40 onto that surface of the edge strip that is to be heated with the hot air. The operation of the edge-strip application device is controlled such that the first air-outlet duct 27 is only opened, by the third closure member 6' being moved axially upward in the vertical direction, when the last approximately 10 cm of the workpiece pass the nozzle arrangement 1 of the edge-strip application device. Then, the hot air also flows through the air-outlet openings 40 of the second group 4b and through the air-outlet openings 40' of the fourth group 4d. The result of this is that the edge strip 2, for reactivation, can be glued reliably and with high quality in the region of the last approximately 6 cm to 10 cm of the workpiece, too. Otherwise, the last about 6 cm to 10 cm of the edge strip 2 to be applied to the workpiece would be heated and activated only in a satisfactory manner and thus not optimally. In order to avoid overheating of further plant parts (for example pressure rollers or the like), the third closure member 6' is subsequently immediately transferred back into its closed position so that hot air can no longer emerge from the air-outlet openings 40, 40' of the second group 4b and of the fourth group 4d.

The principle demonstrated in FIG. 6 can also be used in the nozzle body 3 illustrated in FIG. 2, in that corresponding air-outlet openings 40' are introduced into the exit region 16, which is shaped in a wedge-like manner, and a closure member 6' that is movable separately in the above-described manner is provided.

Under particular plant-specific conditions, the available space may possibly be insufficient to provide corresponding (additional) air-outlet openings 40' in the exit region 16, which is shaped in a wedge-like manner. In order to obtain a comparable effect, the second group 4b of air-outlet openings 40 can be assigned a closure member 6' which is movable separately from the further closure member 6/the further (simultaneously movable) closure members 6 and is embodied in the above-described manner.

The invention claimed is:

1. A nozzle arrangement (1) for an edge-strip application device, for exposing an adhesive-free, heat-activatable edge strip (2) or workpiece or an edge strip (2) or workpiece that is coated with hotmelt adhesive to hot air, comprising a nozzle body (3) having
    at least one air-inlet duct (20, 21) which is connectable to a hot-air generator such that pressurized hot air can be fed to the nozzle body (3) during operation of the edge-strip application device,
    at least two groups (4a, 4b, 4c) of air-outlet openings (40), wherein the air-outlet openings (40) are configured in a manner spaced apart from one another in the vertical direction on an air-outlet surface (30), facing the edge strip (2), of the nozzle body (3) and are connected in terms of flow to the at least one air-inlet duct (20, 21) such that the at least two groups (4a, 4b, 4c) of air-outlet openings (40) are spaced apart from one another in the advancing direction of the edge strip (2) and, the hot air fed to the nozzle body (3) can flow out of the air-outlet openings (40) and can be exposed to a heat-activatable functional layer of the edge strip (2),
    a number of closure members (6, 6') that corresponds to the number of groups (4a, 4b, 4c) of air-outlet openings (40), said closure members (6, 6') being configured such that at least some of the air-outlet openings (40) can be selectively opened or closed depending on the width of the fed edge strip (2).

2. The nozzle arrangement (1) as claimed in claim 1, wherein the nozzle body (3) has a number of air-outlet ducts (27, 28, 29), configured preferably in a hollow-cylindrical manner, that corresponds to the number of groups (4a, 4b, 4c) of air-outlet openings (40), said air-outlet ducts (27, 28, 29) being connected in terms of flow to the at least one air-inlet duct (20, 21) and comprising the air-outlet openings (40).

3. The nozzle arrangement (1) as claimed in claim 2, wherein the closure members (6, 6') are configured such that they can be guided axially into the air-outlet ducts (27, 28, 29) in order to close at least some of the air-outlet openings (40).

4. The nozzle arrangement (1) as claimed in claim 3, wherein the nozzle arrangement (1) comprises a closure-member holder (10) on which the closure members (6, 6') are fitted such that they are adjustable simultaneously in the air-outlet ducts (27, 28, 29), or in that the nozzle arrangement (1) comprises a closure-member holder (10) on which the closure members (6, 6') are fitted such that at least one of the closure members (6') is adjustable independently of the remaining closure members (6).

5. The nozzle arrangement (1) as claimed in claim 2, wherein the nozzle body (3) comprises a plurality of preferably hollow-cylindrical air-distribution ducts (22-26) which extend in the transverse direction through the at least one air-inlet duct (20, 21) and through the air-outlet ducts (27, 28, 29).

6. The nozzle arrangement (1) as claimed in claim 1, wherein the nozzle arrangement (1) has an edge-strip hold-down means (9) which is configured such that it can guide an upper edge of the edge strip (2) along the nozzle body (3).

7. The nozzle arrangement (1) as claimed in claim 6, wherein characterized in that the nozzle arrangement (1) comprises a connecting means (15) by means of which the edge-strip hold-down means (9) and the closure-member holder (10) are connected together.

8. The nozzle arrangement (1) as claimed in claim 1, wherein characterized in that the nozzle body (3) has, in an entry region of the edge strip (2), a guiding section (7) that widens in the advancing direction and is preferably beveled sectionally in a wedge-shaped manner.

9. The nozzle arrangement (1) as claimed in claim 8, wherein characterized in that the guiding section (7) has a sloping surface section (70) that widens in the advancing direction of the edge strip (2), and a spacer section (71) that adjoins said sloping surface section (70), extends in the vertical direction and is raised, preferably by about 1.5 mm, with respect to the air-outlet surface (30) of the nozzle body (3).

10. The nozzle arrangement (1) as claimed in claim 1, wherein downstream of the air-outlet surface (30) in the advancing direction of the edge strip (2), the nozzle body (3) has an exit region (16) that narrows and is preferably formed at least sectionally in a wedge-like manner.

11. The nozzle arrangement (1) as claimed in claim 1, wherein characterized in that the nozzle arrangement (1) has a guiding means (18), extending in the horizontal direction, for the edge strip (2), said guiding means (18) preferably being formed by a steel wire which is connected to the nozzle body (3) in a region facing the edge strip (2) and extends in particular along the entire length of the air-outlet surface (30) and of the exit region (16) of the nozzle body (3).

12. An edge-strip application device, comprising at least one nozzle arrangement for an edge-strip application device, for exposing an adhesive-free, heat-activatable edge strip (2) or workpiece or an edge strip (2) or workpiece that is coated with hotmelt adhesive to hot air, comprising a nozzle body (3) having at least one air-inlet duct (20, 21) which is connectable to a hot-air generator such that pressurized hot air can be fed to the nozzle body (3) during operation of the edge-strip application device, at least two groups (4a, 4b, 4c) of air-outlet openings (40), wherein the air-outlet openings (40) are configured in a manner spaced apart from one another in the vertical direction on an air-outlet surface (30), facing the edge strip (2), of the nozzle body (3) and are connected in terms of flow to the at least one air-inlet duct (20, 21) such that the at least two groups (4a, 4b, 4c) of air-outlet openings (40) are spaced apart from one another in the advancing direction of the edge strip (2) and the hot air fed to the nozzle body (3) can flow out of the air-outlet openings (40) and can be exposed to a heat-activatable functional layer of the edge strip (2), a number of closure members (6, 6') that corresponds to the number of groups (4a, 4b, 4c) of air-outlet openings (40), said closure members (6, 6') being configured such that at least some of the air-outlet openings (40) can be selectively opened or closed depending on the width of the fed edge strip (2).

\* \* \* \* \*